United States Patent [19]

Takaichi et al.

[11] Patent Number: 5,787,192
[45] Date of Patent: Jul. 28, 1998

[54] IMAGE DATA COMPRESSION APPARATUS AND IMAGE DATA COMMUNICATION SYSTEM

[75] Inventors: Toshio Takaichi; Yoshihiro Nakagawa, both of Aichi-ken, Japan

[73] Assignee: Kabushikaisha Equos Research, Japan

[21] Appl. No.: 525,147

[22] Filed: Sep. 8, 1995

[30] Foreign Application Priority Data

Sep. 27, 1994 [JP] Japan .................................. 6-257553
Nov. 25, 1994 [JP] Japan .................................. 6-315943

[51] Int. Cl.[6] .................................................. H04N 1/46
[52] U.S. Cl. .................................................. 382/166; 358/539
[58] Field of Search .................................. 358/426–433, 358/539; 382/166, 232, 236; H04N 1/46

[56] References Cited

U.S. PATENT DOCUMENTS

| | | | |
|---|---|---|---|
| 5,046,119 | 9/1991 | Hoffert et al. | 382/166 |
| 5,247,589 | 9/1993 | Faul et al. | 382/166 |
| 5,262,878 | 11/1993 | Esserman | 358/426 |
| 5,408,542 | 4/1995 | Callahan | 382/166 |
| 5,544,263 | 8/1996 | Iwamura | 382/166 |
| 5,585,944 | 12/1996 | Rodriguez | 358/539 |

*Primary Examiner*—Thomas L. Stoll
*Attorney, Agent, or Firm*—Lorusso & Loud

[57] ABSTRACT

An image data compression apparatus and image data communication system is disclosed for compressing color image data in relatively simple software process, and compressing a still or moving picture of a color image to be transmitted and/or received thereby.

The image data compression apparatus generates image data having pixel data, each of which is constituted by a luminance signal and color difference signals, and generates n×m block data. Block components constituted by a plurality of luminance signals, color difference signals, and an n×m bit map representing a distribution of luminance signal components, all of which represent the generated blocks, are generated to compress the data.

12 Claims, 14 Drawing Sheets

INTER-BLOCK COINCIDENCE

| COINCIDENT BLOCK | | CODE | CODE LENGTH |
|---|---|---|---|
| PREVIOUS FRAME BLOCK | Pf | 0 | 1 |
| IMMEDIATELY PRECEDING BLOCK | Pb | 1 0 0 | 3 |
| UPPER LEFT BLOCK | Prl | 1 0 1 1 0 | 5 |
| IMMEDIATELY ABOVE BLOCK | Pr | 1 0 1 0 | 4 |
| UPPER RIGHT BLOCK | Prr | 1 0 1 1 1 | 5 |

INTER-BLOCK NONCOINCIDENCE

| SIMILAR BLOCK | | CODE | CODE LENGTH |
|---|---|---|---|
| PREVIOUS FRAME BLOCK | Pf | 1 1 0 + ●●●●● + ★★ ⋯ | 8 + ★ |
| IMMEDIATERY PRECEDING BLOCK | Pb | 1 1 1 + ●●●●● + ★★ ⋯ | 8 + ★ |

| COINCIDENT BLOCK | | CODE | CODE LENGTH |
|---|---|---|---|
| PREVIOUS FRAME BLOCK | Pf | 0 0 | 2 |
| IMMEDIATELY ABOVE BLOCK | Pr | 0 1 0 | 3 |
| IMMEDIATELY PRECEDING BLOCK | Pb | 0 1 1 0 | 4 |
| UPPER LEFT BLOCK | Prl | 0 1 1 1 0 | 5 |
| PREVIOUS FRAME BLOCK CONTINUATION | Pfh | 0 1 1 1 1 +lenght+ h | 5 + 5 |

FIG. 9

FIG. 12A    FIG. 12B    FIG. 12C
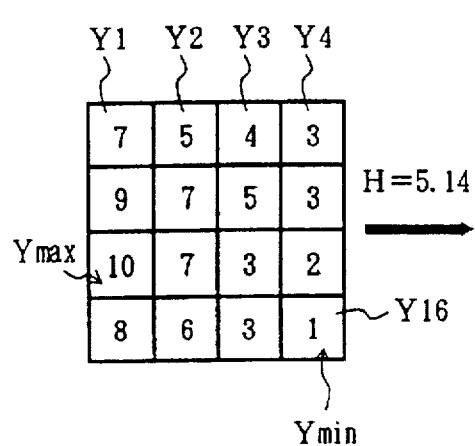
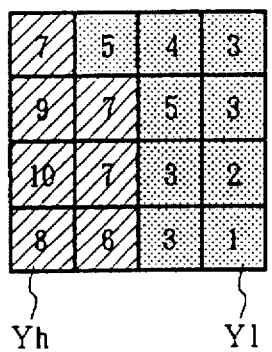
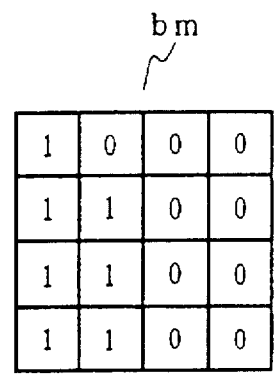
FIG. 12D
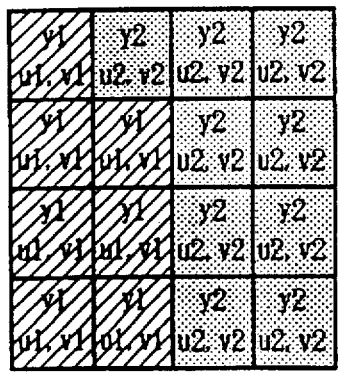

| NO | y | u | v |
|----|----|----|----|
| 0 0 | | | |
| 0 1 | | | |
| 0 2 | | | |
| ⋮ | | | |
| C 1 | yl | um | vn |
| ⋮ | | | |
| C 2 | yp | uq | vr |
| ⋮ | | | |
| F F | | | |

INTER-BLOCK COINCIDENCE

| COINCIDENT BLOCK | | CODE | CODE LENGTH |
|---|---|---|---|
| REFERENCE BLOCK | Rb | 0 0 | 2 |
| IMMEDIATELY ABOVE BLOCK | Pr | 0 1 0 | 3 |
| IMMEDIATELY PRECEDING BLOCK | Pb | 0 1 1 0 | 4 |
| UPPER LEFT BLOCK | Prl | 0 1 1 1 | 4 |

FIG. 15B

INTER-BLOCK COMPONENT COINCIDENCE

| COINCIDENT BLOCK | | CODE | CODE LENGTH |
|---|---|---|---|
| REFERENCE BLOCK | Rb | 1 0 +●●●+★··· | 5+★ |
| IMMEDIATELY ABOVE BLOCK | Pr | 1 1 0 +●●●+★··· | 6+★ |
| IMMEDIATELY PRECEDING BLOCK | Pb | 1 1 1 +●●●+★··· | 6+★ |

C 1, C 2, bm

| 1 | 0 | 0 | 0 |
|---|---|---|---|
| 1 | 1 | 0 | 0 |
| 1 | 1 | 0 | 0 |
| 1 | 1 | 0 | 0 |

| C1 | C2 | C2 | C2 |
|----|----|----|----|
| C1 | C1 | C2 | C2 |
| C1 | C1 | C2 | C2 |
| C1 | C1 | C2 | C2 |

*FIG. 16B*

IMAGE DATA COMPRESSION APPARATUS AND IMAGE DATA COMMUNICATION SYSTEM

BACKGROUND OF THE INVENTION

1. Field of the Invention

The present invention relates to an image data compression apparatus and an image data communication system, for compressing color image data and compressing a still or moving picture of a color image to be transmitted and/or received thereby.

2. Description of the Related Art

In a video conference and a visual telephone, or a communication karaoke (automatic musical accompaniment), and the like, moving or still color image has been subjected to digital signal processing to be transmitted and/or received. It has been important to perform easy and efficient compression of a color image in data transmission because the data volume of the color image is very large. For example, discrete cosine transformation (DCT) is available as a conventional popular image data compression method and is used to compress a still color image in accordance with JPEG (Joint Photographic Experts Group).

The DCT technique utilizes the property of a natural image that pixels adjacent to each other have small changes and a high correlation. More specifically, an image having a very high spatial correlation is decomposed into its frequency components according to orthogonal transformation, so that most of the signal components are distributed in a low-frequency range, thereby making high-frequency components approach zero.

In compressing a still color image in accordance with JPEG, image data in each an 8×8 block is converted into 8×8 frequency components, and quantization is performed to set high-frequency components to zero, thereby causing data "0" to continue in the high-frequency range. Run-length coding and Huffman coding are then performed to reduce the data volume.

FST (Four Square Transform) was proposed by John D. Music as another encoding scheme for compressing moving image data and was patented as U.S. Pat. No. 5,164,918 "METHOD AND SYSTEM FOR CODING AND COMPRESSING COLOR VIDEO SIGNALS", Nov. 17, 1992. In this FST, a video signal constituted by R (red), G (green), and B (blue) data is divided into blocks each consisting of 4×4 pixels. The colors of pixels belonging to one block are classified into colors A and B. Each block is encoded into components representing colors A and B and a bit map for distinguishing A from B. The non-redundant information in the encoded block is found and encoded, and the block of each frame is compared with that of the immediately preceding frame to eliminate inter-block and inter-frame redundancies. In addition, the current color value is encoded in the form of a difference with respect to the immediately preceding color value, thereby compressing the information volume.

In outputting image data to an image display device, in order to decrease the load on a CPU (Central Processing Unit) or the like, the data transfer rate of a system bus is lowered to perform a color reduction process. The color reduction process is a process in which a full-color natural image having 16.77 million (=$2^{24}$) colors obtained by assigning 8 bits to each of R, G, and B (red, green, and blue) components or Y, U, and V (luminance signal and color difference signals) components for each pixel is processed to be displayed in 256 or 16 colors. In this color reduction process, 256 colors are selected from all combinations as 16.77 million colors, and a CLUT (Color Look Up Table) in which indices are respectively assigned to the colors is formed. Each pixel information is caused to correspond to an index of this CLUT.

Pixel data compressed/decompressed (expanded) by JPEG or the like has color value data, and the pixel values in a video memory linearly correspond to the color values. When a compression/decompression process using JPEG or the like is applied to an index color display in the color reduction process, the decompressed pixel data is subjected to the color reduction process on the elongation side, thereby forming a CLUT.

This image data compression by the DCT results in a large transformation processing volume, thus taking a long time in a software transformation process. It is possible to use DCT hardware to increase the processing speed. However, in this case, DCT hardware for compressing image data is required on the data transmission side, and DCT hardware for decompressing the compressed image data is also required on the data reception side. In addition, after RGB original image data is stored in a frame buffer, this data is subjected to frequency conversion, thereby requiring large-capacity frame buffers on both the transmitter and receiver.

On the other hand, when the index color display and JPEG are applied, a color reduction process must be performed to form a CLUT on the elongation side. The software process on the elongation-side apparatus is overloaded, thereby complicating a hardware configuration.

SUMMARY OF THE INVENTION

It is the first object of the present invention to provide an image data compression apparatus capable of compressing color image data in a relatively simple software process.

It is the second object of the present invention to provide an image data compression apparatus for performing image data compression capable of easy image decompression on the image elongation side.

According to a preferred embodiment, an image data compression apparatus according to the present invention generates image data having pixel data, each of which is constituted by a luminance signal and color difference signals, and generates n×m block data. Block components constituted by a plurality of luminance signals, color difference signals, and an n×m bit map representing a distribution of luminance signal components, all of which represent the generated blocks, are generated to compress the data.

In this preferred embodiment, a similar block whose block components coincide with or are most similar to the block components generated by an encoding unit is selected. Also, the block components generated by the encoding unit are encoded according to code data representing the similar block and difference data between the block components generated by the encoder unit and the block components of the similar block. Thus, the data is further compressed.

In this preferred embodiment, identical block components existing in the largest number are detected from all block components, of a still image, generated by a block generator, and coincident or most similar blocks containing the detected identical block components are selected.

In another preferred embodiment, an image data compression apparatus according to the present invention generates image data having pixel data, each of which is constituted by a luminance data and color difference signals, and generates an n×m block data. Block components constituted by first and second color components having the luminance and color difference signals, and an n×m bit map representing a distribution of the first and second color components are generated to compress the data. A CLUT for performing a color reduction process for reducing the number of colors for the first and second color components into an arbitrary number of colors is formed, and this CLUT is transmitted together with the block components.

In this preferred embodiment, the first and second color components of the block components generated by an encoding means are subjected to a color reduction process using the CLUT generated by the CLUT generating means. Block components constituted by the color-reduced first and second color components and the n×m bit map are generated. The CLUT and the color-reduced block components are transmitted.

In this preferred embodiment, a similar block having block components coinciding with or most similar to non-color-reduced or color-reduced block components is selected, and the non-color-reduced or color-reduced block components are encoded in accordance with code data representing this similar block and difference data between the non-color-reduced or color-reduced block components and the block components of the similar block, thereby further compressing the data.

In this preferred embodiment, still image blocks having color-reduced block components having high frequencies of occurrence upon the color reduction process using the CLUT are detected. Coincident or most similar blocks containing the block components having the high frequencies of occurrence are selected, thereby further increasing the compression ratio.

In still another preferred embodiment, in an image communication system according to the present invention, a receiving means of an image elongation apparatus receives a signal transmitted from an image data compression apparatus. A decoding means generates the luminance and color difference signals of each pixel constituting the n×m block from the received block components.

BRIEF DESCRIPTION OF THE DRAWINGS

The above objects, other features, and advantages of the present invention will be readily understood with reference to the following description of the preferred embodiments in conjunction with the accompanying drawings, in which

FIG. 9 is a table showing other encoding rules of the present invention;

FIGS. 12A to 12D are tables for explaining detailed calculations of a threshold H., luminance components y1 and y2, and color difference components u1, u2, v1, and v2 in the encoder of the third embodiment;

FIGS. 13A and 13B are tables for explaining a CLUT formed by a color reduction unit and a color-reduced data distribution according to the third embodiment;

FIGS. 15A and 15B are tables showing encoding rules for block components in the encoder of the third embodiment; and FIGS. 16A and 16B are tables for explaining generation of index color data of a 4×4 pixel matrix from color-reduced block components C1, C2, and bm in a block decoder of the third embodiment.

DETAILED DESCRIPTION OF THE PREFERRED EMBODIMENTS

Figure 1:
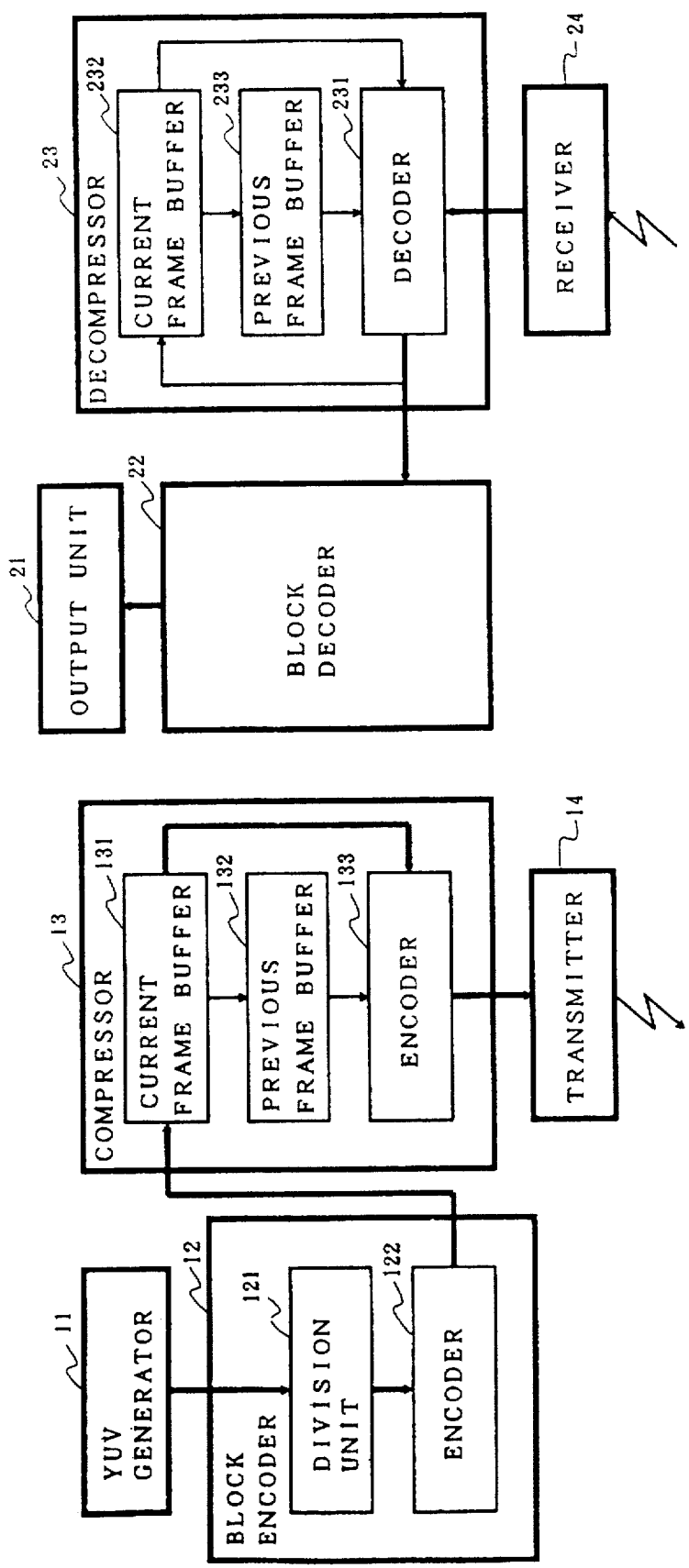
FIGS. 1A and 1B are block diagrams showing the system configuration of an image data compression communication system according to the first embodiment.

Image compression communication systems using image compression apparatuses according to preferred embodiments of the present invention will be described in detail with reference to FIGS. 1A to 16B.

FIGS. 1A and 1B show the system configuration of an image data compression communication system for transmitting and/or receiving moving image data according to the first embodiment. As shown in FIGS. 1A and 1B, the image data compression communication system includes a transmission side (FIG. 1A) for compressing and encoding image data and transmitting the compressed data, and a reception side (FIG. 1B) for decoding and decompressing the compressed data.

The transmission side of the image data compression communication system comprises a YUV generator 11 for generating image data having pixels each constituted by a luminance signal Y and color difference signals U and V (referred to as a pixel luminance component Y and pixel color difference signals U and V hereinafter), a block encoder 12, a compressor 13 for performing encoding upon determination of the inter-frame or intra-frame coincidences of the converted block components, and a transmitter 14 for transmitting the encoded data.

The block encoder 12 comprises a division unit 121 for dividing the image data generated by the YUV generator 11 into blocks each having a size of n×m pixels, and an encoder 122 for generating the block components of each block from the YUV data of each pixel constituting this block.

The compressor 13 comprises a current frame buffer 131 for storing one-frame block components of the current frame subjected to an encoding process, a previous frame buffer 132 for storing one-frame block components of the immediately preceding frame, and an encoder 133 for performing data encoding in accordance with an encoding scheme based on the coincidence or noncoincidences of the block components.

On the other hand, the receiving side comprises a receiver 24 for receiving encoded data, a decompressor 23 for inversely transforming the encoded data into block components, a block decoder 22 for inversely transforming the block components into YUV pixel data, and an output unit 21 for outputting the YUV data.

The decompressor 23 comprises a decoder 231 for decoding the data encoded by the encoder 133 on the transmission side into the original block components, a current frame buffer 232 for storing the decoded block components of the frame currently subjected to a decoding process, and a previous frame buffer 233 for storing immediately preceding block components supplied from the current frame buffer 232.

The basic concept of image data compression in the image data compression communication system according to this embodiment will be described below.

More specifically, in image data compression, the image data compression communication system compresses an image on the basis of the following premises: ① the nature in which the human eye is sensitive to changes in luminance, but is not sensitive to changes in color; ② an assumption that only one color is present in one block generally formed in a large number of natural images when pixels constituting an image are arbitrarily formed into blocks; and ③ the fact that most pixels have no change between a given frame and the immediately preceding frame in a general moving image.

An operation for transmitting/receiving moving image data in the embodiment having the above arrangement will be described below.

The YUV generator 11 on the transmission side of the image data compression communication system generates image data of each frame having pixels each constituted by a luminance signal Y and color difference signals U and V from, e.g., CCD (Charge Coupled Device).

When color information consisting of R (red), G (green), and B (blue) is input to the YUV generator 11 as information representing colors, the YUV data is calculated by equations (1) below using this color information, so that the YUV generator 11 generates Y, U, and V data. Note that each of R, G, and B color information is expressed in 8 bits, so that 16,777,216 (=$2^8 \times 2^8 \times 2^8$) colors can be expressed. Each of the converted Y, U, and V data is also expressed in 8 bits with respect to the corresponding R, G, or B component.

The Y, U, and V data generated by the YUV generator 11 are sequentially supplied to the block encoder 12 in units of frames.

$$Y=0.299R+0.587G+0.114B$$

$$U=0.564(B-Y)$$

$$V=0.713(R-Y) \quad (1)$$

Figure 2:
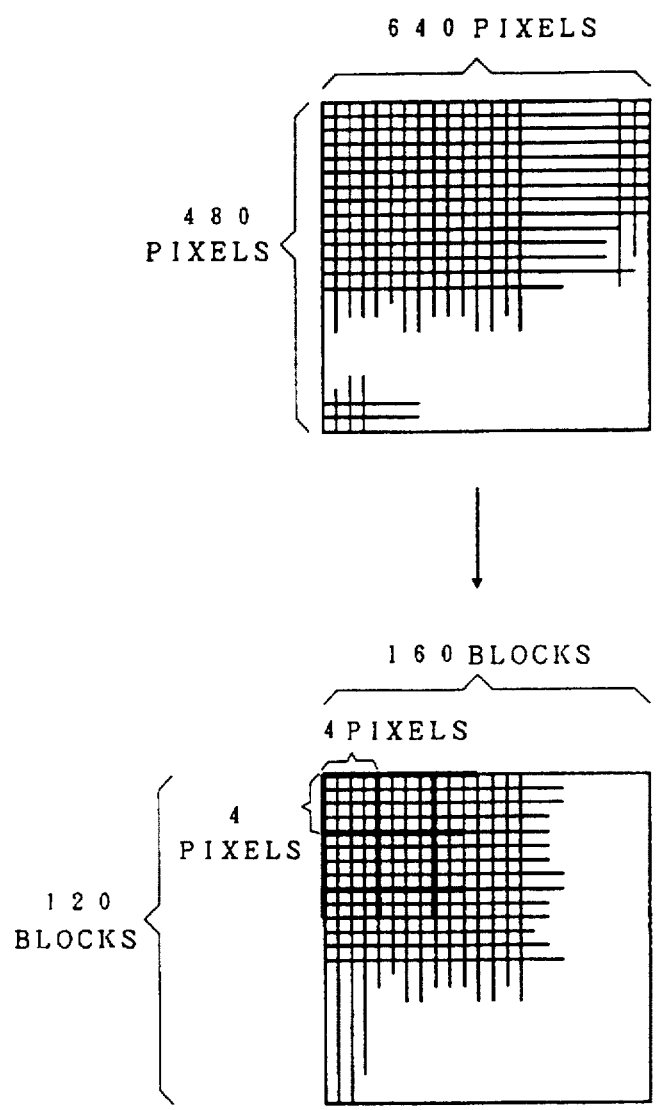
FIG. 2 is a view for explaining an operation for dividing image data into blocks each consisting of 4×4 pixels according to the first embodiment.

When the image data is supplied to the block encoder 12, the division unit 121 divides the image data into an arbitrary n×m size of, e.g., 4×2, 2×4, 8×4, or 8×8 for each frame. In this embodiment, as shown in FIG. 2, the image data is divided into blocks each having a size of 4×4 pixels. The resolution per frame of the original image can be arbitrarily selected if it is an integer multiple of the division size. In this embodiment, the resolution is defined as 307,200 (=640×480 pixels) pixels/frame. Therefore, one frame of the original image is divided into 19,200 (=160×120 blocks) blocks by the division unit 121.

Figure 3:
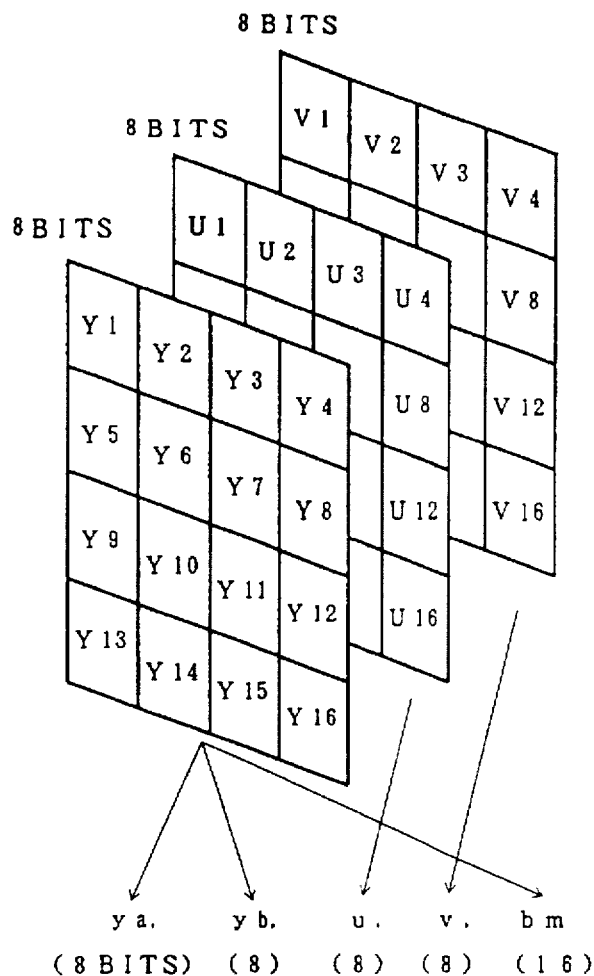
FIG. 3 is a view for explaining generation of block components ya, yb, u, v, and bm from YUV data in an encoder of the first embodiment.

As shown in FIG. 3, the encoder 122 generates block components consisting of block luminance components ya and yb, block color difference components u and v, and bm (bit map) from 16-pixel YUV data contained in each divided block. In these block components, the components ya, yb, u, and v are 8-bit data, respectively, and the component bm consists of 16-bit data. Data consisting of 384 (=8 bits×3 components (Y, U, and V)×16 pixels) bits/block in the division by the division unit 121 is compressed into data having 48 (=8 bits×4 block components (ya, yb, u, and v)+16 bits (bit map)) bits in accordance with the block components. That is, data is compressed into ⅛ (=48/384) data by the encoder 122.

The calculations of the respective block components will be described below.

The block color difference components u and v are respectively generated by average values of pixel color difference components U1 to U16 and V1 to V16 in each block. That is, the components u and v are calculated by u=(ΣUi)/16 and v=(ΣVi)/16, respectively, wherein the range of i in the summation is 1 to 16.

The block luminance components ya and yb are calculated as follows. A threshold H is calculated from pixel luminance components Y1 to Y16 in each block, an average value of pixels having pixel luminance components Yh equal to or larger than the threshold H is defined as ya, and an average value of pixels having pixel luminance components Yl smaller than the threshold H is defined as yb.

The threshold value H can be arbitrarily selected and determined by a variety of methods. In this embodiment, the threshold H is defined as an average value of 14 pixel luminance components Y excluding a maximum and minimum values Ymax and Ymin of the pixel luminance components Y.

The threshold H and the block luminance components ya and yb are calculated by equations (2) below:

$$H=[(\Sigma Yi)-Y_{max}-Y_{min}]/14$$

$$ya=(\Sigma Yh)/p$$

$$yb=(\Sigma Yl)/q$$

where p is the number of components Yh, and q is the number of components Yl for p+q=16.

Figures 4A, 4B, 4C:
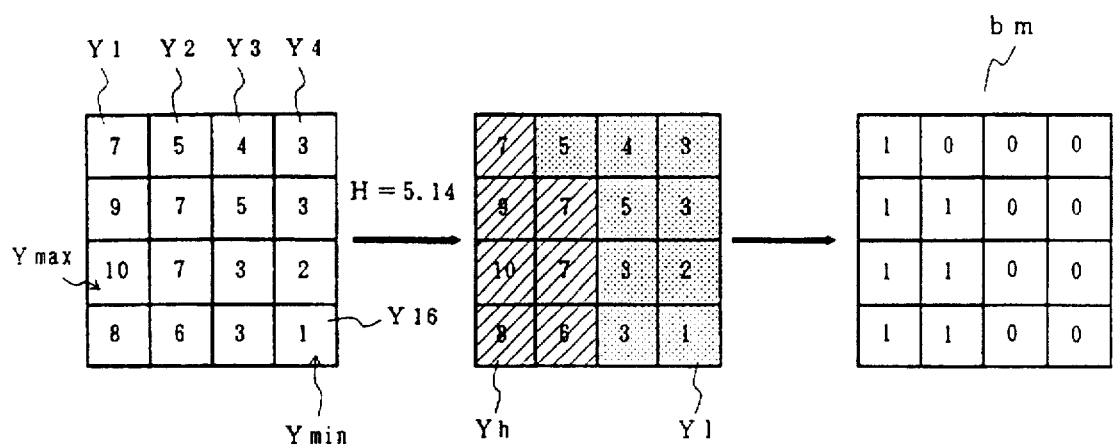
FIGS. 4A to 4C are views for explaining generation of luminance components ya and yb and a bit map bm in an encoder of the first embodiment.

FIGS. 4A to 4C are views showing practical calculations of the threshold H and the block luminance components ya and yb. Assume the pixel luminance components Y1 to Y16 in each block have values shown in FIG. 4A. In this case, the maximum value Ymax is the value, "10", of the component Y9, and the minimum value Ymin the value, "1", of the component Y16. The average value of the pixel luminance components excluding the pixel luminance components Y9 and Y16 is (83−10 −1)/14=5.14. Therefore, the threshold H=5.14.

The seven pixel luminance components Y1, Y5, Y6, Y9, Y10, Y13, and Y14 indicated by hatched lines in FIG. 4B correspond to the pixel luminance components Yh having values equal to or larger than the threshold H, so that the block luminance component ya=77.1 is obtained from the average value of these seven components. The nine pixel luminance components Y2, Y3, Y4, Y7, Y8, Y11, Y12, Y15, and Y16 indicated by dotted regions correspond to the pixel luminance components Yl having values smaller than the threshold H, so that the block luminance component yb=3.22 is obtained from the average value of these nine components.

As shown in FIG. 4C, the values of the seven pixel luminance components Yh are all defined as block luminance components ya, which are then expressed by codes "1". On the other hand, the values of the nine pixel luminance components Y1 are all defined as the block luminance components yb, which are then expressed by codes "0", thereby forming a binary bit map bm.

That is, bm=("1000110011001100") is obtained.

The block encoder 12 sends the block components (ya, yb, u, v, and bm) of each block, which are generated by the encoder 122, to the compressor 13.

The compressor 13 transfers data (block components of the immediately preceding frame) already stored in the current frame buffer 131 to the previous frame buffer 132 and stores the block components from the block encoder 12 in the current frame buffer 131.

The encoder 133 performs data encoding of the block components a target block (latest block) under block component coincidence conditions which the previous block (Pf) and the neighboring blocks of the current frame.

Figures 5, 6A, 6B:
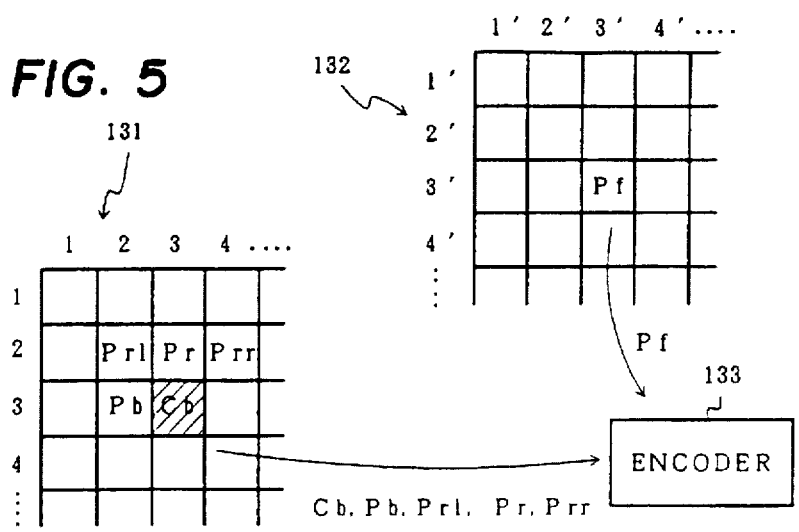
FIG. 5 is a view for explaining the concept of data encoding under block component coincidence conditions in the encoder of the first embodiment.
FIGS. 6A and 6B are tables showing encoding rules of block components in the encoder of the first embodiment.

FIG. 5 is a view for explaining the concept of data encoding under block component coincidence conditions.

Referring to FIG. 5, assume that a block in row #3 and column #3 of the current frame (this block is represented by a hatched region) is to be encoded as a process block Cb, and that a previous block stored in row #3' and column #3' which represent a position identical to that in the previous buffer 132 with respect to this process block Cb is defined as Pf. Also assume that a block in row #3 and column #2 having subjected to an encoding process, which immediately precedes the process block, is defined as Pb, and that a block (row #2 and column #2) located at the upper left position of the process block Cb, a block (row #2 and column #3) located immediately above the process block, and a block (row #2 and column #4) located at the upper right position of the process block, all of which are located on row #2 one row ahead of the process block, are defined as Pr 1 ,Pr, and Prr, respectively.

The block components of the process block Cb are compared with the block components of the comparison blocks Pf, Pb, Pr 1, Pr, and Prr to find identical blocks. The identical blocks are encoded in accordance with encoding rules in FIG. 6A.

More specifically, if the process block Cb coincides with the immediately preceding block Pb, the block components ya, yb, u, v, and bm (a total of 48 bits) of the process block Cb are compressed into 3 bits represented as "100".

On the other hand, no identical block is found in the comparison blocks, the encoder 133 determines whether the block components of the process block Cb are similar to those of the previous frame block Pf or the immediately preceding block Pb. The encoder 133 encodes a similar block in accordance with the encoding rules in FIG. 6B. More specifically, each code is represented by a 3-bit header representing a similar block, a 5-bit map ("●●●●") representing the coincidence or noncoincidences of the corresponding block components ya, yb, u, v, or bm, and noncoincident Cb components (★★ . . . ). "●●●●" is a bit string of "0"s or "1"s. ★ represents a numeric value as the actual component value of the process block Cb. Each component value is expressed by an 8-bit binary number.

It is assumed that the values of the components of the process block Cb and the immediately preceding block Pb similar to the process block Cb are given as follows:

Cb; ya=200, yb=100, u=128, v=120, bm=x

Pb; ya=200, yb=120, u=110, v=120, bm=x

In this case, the process block Cb is expressed by the following code. The header is expressed as a bit string "111" representing the immediately preceding block serving as a similar block. The coincidence/noncoincidence bit map is represented as a bit string "01100" because the components ya, v, and bm of the two blocks coincide with each other and the components yb and u of the two blocks do not coincide with each other. The noncoincident component values of the process block Cb are expressed by numeric values yb=100 and u=128.

The code of the process block Cb becomes 3-bit header ("111")+5-bit coincidence/noncoincidence bit map ("011000")+noncoincident component values (100 and 128). Each noncoincident component value (100 or 128) is expressed in 8 bits.

The encoded data of the block components of the process block Cb encoded by the compressor 13 has a minimum data volume when it coincides with the previous frame block Pf. In this case, since the data volume of one block divided in the division unit 121 is 384 (=8×3×16) bits, the data is compressed into 1/384 data.

The data encoded by the compressor 13 has a maximum data volume when no coincidence is established between frames and none of the components of the process block Cb coincide with any of the blocks Pf and Pb. In this case, the volume of the data encoded by the compressor 13 is 56 (3+5+48) bits, so that the compression ratio is 1/6.8 (=56/384).

By the above processes, the encoded data of the block components encoded by the encoder 133 are supplied from the compressor 13 to the transmitter 14 in units of frames. The transmitter 14 transmits the data to the receiving side shown in FIG. 1B by means of a variety of communication means such as a telephone network, a leased network, radio communication, an ISDN (Integrated Services Digital Network), and computer communication.

Reception of the encoded data results in transmission of the encoded data to the decompressor 23 by the receiver 24 on the receiving side. The decompressor 23 selects a block from the previous frame block Pf, the immediately preceding block Pb, the upper left block Pr 1 the immediately above block Pr, and the upper right block Prr for the encoded data in accordance with the encoding code assignment rules in FIGS. 6A and 6B.

A fact such that the encoded data is a code representing an inter-block coincidence involves the block components ya, yb, u, v, and bm stored (already decoded) at the corresponding positions to be stored in the current frame buffer 232 as the block components of a process block Db as a target block. If the encoded data is a code representing an inter-block noncoincidence, the block components of the process block Db are generated according to the encoded data and the block components of a similar block designated by the header of the encoded data in accordance with the encoding code assignment rules in FIG. 6B. The generated block components are stored in the current frame buffer 232.

The decoder 231 generates the non-encoded block components ya, yb, u, v, and bm of the process block Db to be supplied to the block decoder 22.

Figures 7A, 7B:
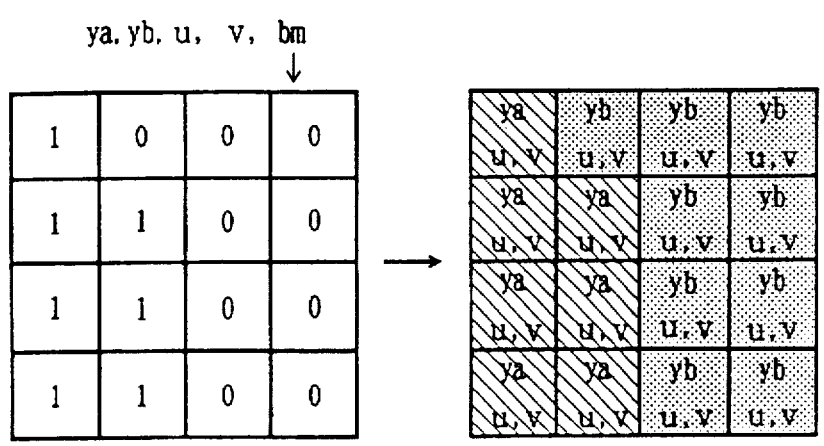
FIGS. 7A and 7B are tables for explaining generation of YUV data having a 4×4 pixel matrix from the block components ya, yb, u, v, and bm in a block decoder of the first embodiment.

The block decoder 22 generates YUV data of 4×4 pixels from the block components ya, yb, u, v, and bm, as shown in FIG. 7B. More specifically, if the block component bm is a bit map shown in FIG. 7A, pixels whose bit map data are "1" are Y=ya, U=u, V=v, while pixel whose bit map data are "0" are Y=yb, U=u, and V=v. In this manner, the decoded block data represents one color given by color difference data U and V and two luminance components ya and yb constituting luminance data Y.

The image data reconstructed upon compression in the image data compression communication system of this embodiment has only one color in each divided block in a natural image. Since the human eye is not so sensitive to changes in color, image degradation was not noticeable even if the sixteen (=4×4) colors of U1 to U16 and V1 to V16 in one block were converted into one block represented by components u and v. In addition, since the human eye is sensitive to changes in luminance rather than those in color, the luminance components Y consisting of two members, i.e., ya and yb. Therefore, degradation with changes in luminance was not noticeable, either.

The block decoder 22 supplies the Y, U, and V data of each decoded pixel to the output unit 21. The output unit 21 outputs the resultant data to a variety of display devices (not shown) such as CRTs, plasma display devices, and liquid crystal display devices used in a video conference, a video phone, and a communication karaoke.

In this case, if a display device connected to the apparatus of this embodiment requires Y, U, and V data, these data are directly output to the display device. However, when a display device requires RGB data, the Y, U, and V data are converted into R, G, and B data as follows, and the resultant R, G, and B data are output to the display device:

$$B = 1.773U + Y$$

$$R = 1.403V + Y$$

$$G = Y - (0.564/0.587)U + (0.713/0.587)V$$

Figures 8A, 8B:
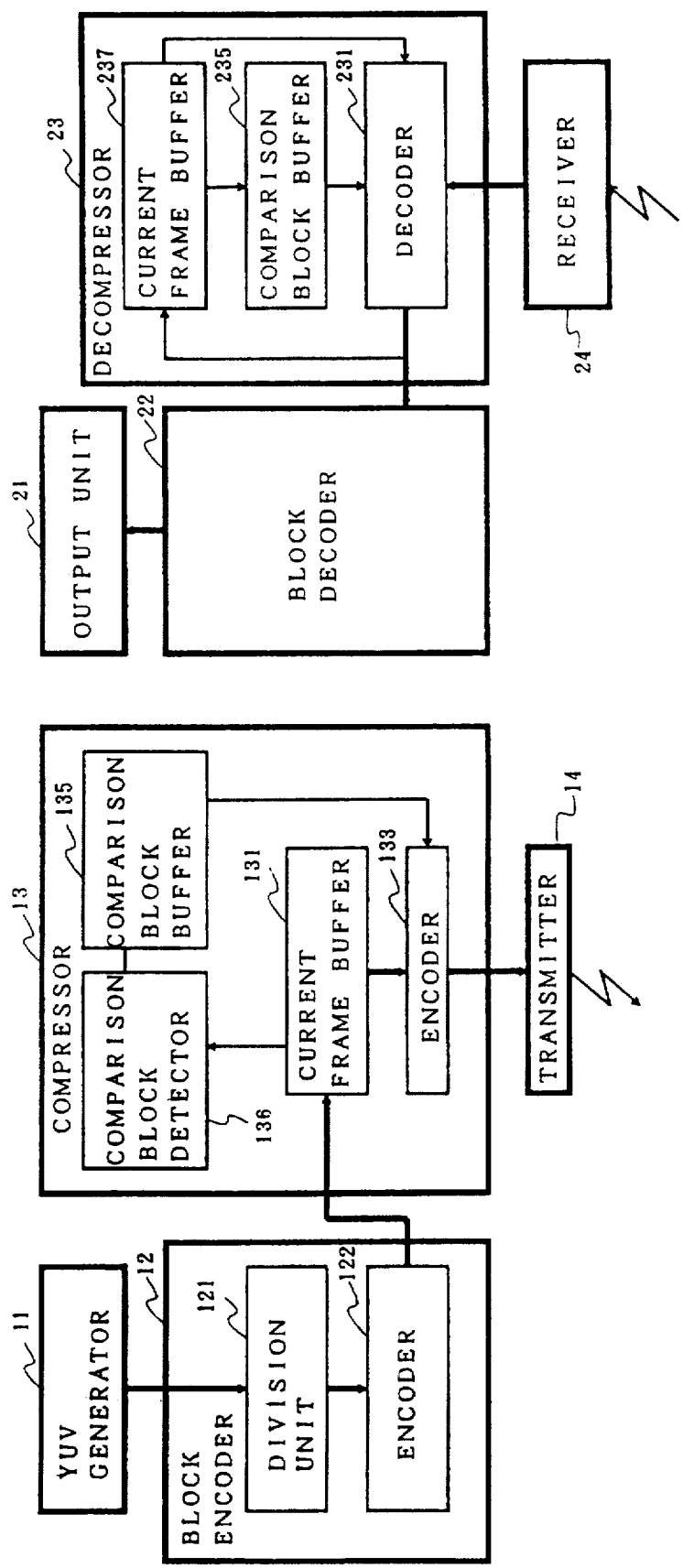
FIGS. 8A and 8B are block diagrams showing the system configuration of an image data compression communication system according to the second embodiment.

A still image data compression communication system according to the second embodiment will be described with reference to the system configuration of FIGS. 8A and 8B. The same reference numerals as in FIGS. 1A and 1B denote the same parts in FIGS. 8A and 8B, and a detailed description thereof will be omitted.

In the still image data compression communication system, unlike in a moving image data compression communication system, a previous frame as a comparison block is absent. In the second embodiment, the apparatus includes a comparison block detector 136 for detecting identical block components existing in the largest number from a current frame buffer 131 which stores one-frame block components, and storing a corresponding block as a comparison block Pf in the comparison block buffer 135. The comparison block buffer 135 comprises a 48-bit buffer for storing block components ya, yb, u, v, and bm of one block.

A decompressor 23 comprises a 48-bit comparison block buffer 235 similar to the buffer 135. A receiver 24 receives the comparison block Pf, unlike the compressor 13. For this reason, a current frame buffer 237 of the decompressor 23 need not store one-frame data, but comprises a buffer capable of storing 2-column block components. As blocks to be compared with the process block Db, the 2-column components are an immediately preceding block Pb, an upper left block Pr 1 an immediately above block Pr, and an upper right block P 1 in addition to the comparison block Pb with respect to the current block.

According to the second embodiment, in transmitting or receiving a still image, identical block components existing in the largest number are detected to define the comparison block Pf. When an encoder 133 is to encode the process block Cb, the frequency of inter-blocks coincidence with the block Pf is maximum, so that encoding can be performed using a shortest code (FIG. 6A), thereby improving compression efficiency.

As described above, according to the first and second embodiments, prior to encoding in the compressor 13, the block encoder 12 has already compressed the data into ⅛ data for each block. For this reason, the sizes of the current frame buffer 131 and the previous frame buffer 132 can be reduced. In particular, in the second embodiment, the current frame buffer can comprise a 2-column buffer, thereby further reducing the buffer size.

The block component encoding process by the encoder 133 and the encoded data decoding process by the decoder 231 are performed by only detection of an inter-frame coincidence and conversion using the encoding rules in FIGS. 6A and 6B. Therefore, these operations can be sufficiently performed by software without requiring special hardware for encoding and decoding data at high speed.

Like a communication karaoke, in an image data compression communication system wherein still and moving images are transmitted from one location such as a central station in a given building and received by a plurality of locations, image processes can be performed by software using small-capacity buffers.

According to the above embodiments described above, an image data compression communication system can be simply arranged.

In the embodiments described above, 16-bit data of the block component bm are subjected to comparison with those of the neighboring blocks. However, the present invention is not limited to this. Sixty-four typical bit maps such as all "1"s, all "0"s, "1"s in the upper half of a bit map, "1"s in the right half of a bit map, "1"s in every other columns, ... may be prepared, and each table may be designated by a 6-bit-code. In this manner, since block components bm are compared using each of the 64 tables each represented by 6 bits, the degree of inter-block coincidences increases to further compress the data. Even if a noncoincidence is determined, data compression by 10 bits is attained because a 16-bit-bit map is expressed in a 6-bit-code string.

In this embodiment, each of the block components ya, yb, u, and v is expressed in 8 bits. The present invention is not limited to this. For example, each block component is expressed in 6 bits or other numbers of bits such as 5 or 4 bits. Alternatively, the luminance and color difference signals may be expressed as data having different numbers of bits such that each of ya and yb is expressed as 8- or 6-bit data and each of u and v is expressed as 6- or 5-bit data.

The present invention is not limited to the encoding rules shown in FIGS. 6A and 6B, but may employ other rules. For example, rules shown in FIG. 9 may be used in inter-block coincidence determination. According to these rules, the upper right block having a relatively low degree of coincidence is removed from comparison targets, and at the same time the contents of a code are changed. A previous frame block continuation Pfn (n≧6) is used when at least six coincident blocks continue.

In calculating the block color difference components u and v from the pixel color different components U and V, the average values of the components U and V are used in the above embodiment. However, the values of pixel color difference components U and V each having the highest frequency of occurrence (maximum population) in the process block may be defined as the block color difference components u and v.

The average value of the pixel luminance components excluding the maximum and minimum pixel luminance components Ymax and Ymin is used as the threshold H for distinguishing the block luminance components ya and yb from each other. However, a simple average value of all the pixel luminance components Y may be defined as the threshold H, or an arbitrary value may be set as the threshold H in accordance with the types of image data to be compressed.

In this embodiment, no coincidence of the block components of the process block Cb with those of any one of the blocks Pf, Pb, Pr 1, Pr, and Prr involves use of the blocks Pf and Pb as selection candidates for a similar block, as shown in FIG. 6B. However, the present invention is not limited to this. An arbitrary block may be selected in advance, and a similar block may be selected with reference to the arbitrary block. For example, two blocks, Pf and Pr, or three blocks, Pf, Pr, and Pb, may be used as selection candidates.

In this embodiment, the blocks Pf, Pb, Pr 1, Pr, and Prr are used as comparison targets for determining whether their block components coincide with all the block components of the process block Cb. However, the blocks Pf, Pb, and Pr having higher probabilities of coincidences may be used as targets. In this manner, when the number of comparison targets is reduced, the software process can be further facilitated.

An image data compression communication system according to the third embodiment will be described below.

Figures 10A, 10B:
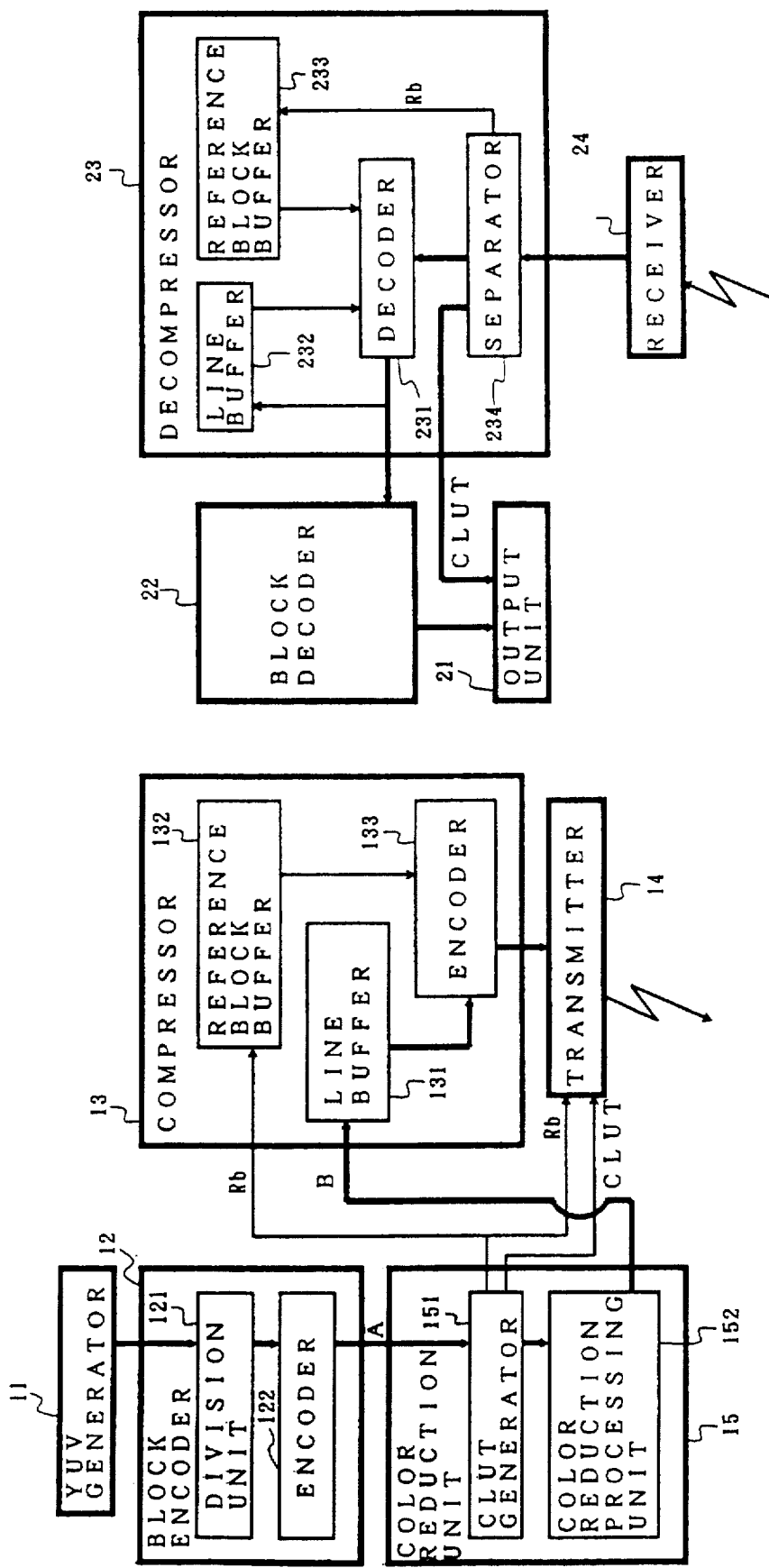
FIGS. 10A and 10B are block diagrams showing the system configuration of an image data compression communication system according to the third embodiment.

FIGS. 10A and 10B show the configuration of the image data compression communication system for transmitting/receiving image data. The image data compression communication system comprises a transmitting side (FIG. 10A) for compressing and encoding image data and transmitting the compressed image data, and a reception side (FIG. 10B) for receiving the compressed data and decoding and decompressing the received data.

The transmission side of the image data compression communication system comprises a YUV generator 11 for generating image data having pixels each constituted by a luminance signal Y and color difference signals U and V, a block encoder 12, a color reduction unit 15, a compressor 13 for determining the inter-frame or intra-frame coincidences of color-reduced block data B and encoding the block data B, and a transmitter 14.

The block encoder 12 comprises a division unit 121 for dividing the image data generated by the YUV generator 11 into blocks each having a size of n×m pixels, and an encoder 122 for generating block data A from the YUV data of each pixel constituting this block. The block data A of each block generated by this block encoder 12 is supplied to the color reduction unit 15.

The color reduction unit 15 comprises a CLUT generator 151 for generating a CLUT from the block data A of all the blocks within one frame and a color reduction processing unit 152 for generating color-reduced block data B from the generated CLUT and the block data A. In the CLUT generation, the CLUT generator 151 detects color-reduced block data having a highest frequency of occurrence in the color reducing process, supplies this data to the compressor 13 as a reference block Rb, and supplies the generated CLUT to the transmitter 14.

The compressor 13 comprises a line buffer 131 for storing 2-line color-reduced block data B of the current frame as an encoding target, a reference block buffer 132 for storing the reference block Rb supplied from the color reduction unit 15, and an encoder 133 for performing data encoding by an encoding scheme depending on the coincidence/noncoincidences of color-reduced block data components.

The transmitter 14 transmits the reference block Rb and the CLUT and at the same time sequentially transmits the encoded data.

On the other hand, the reception side comprises a receiver 24 for receiving data transmitted from the transmitter 14, a decompressor 23 for inversely converting the encoded block data into color-reduced block data, a block decoder 22 for inversely converting the color-reduced block data into color-reduced data for each pixel, and an output unit 21 for outputting YUV data to a display device or the like.

The decompressor 23 comprises a separator 234 for separating the data received by the receiver 24 into the reference block Rb, the CLUT, and the sequentially received encoded data, a decoder 231 for decoding the encoded data into original block data, a line buffer 232 for storing decoded 2-line block data of lines currently subjected to decoding, and a reference block buffer 233 for storing the reference block Rb.

In the third embodiment, image data compression is performed on the basis of the premises ① and ② of the premises ①, ②, and ③ described with reference to the first embodiment.

An operation for transmitting/receiving image data in the third embodiment will be described below.

As in the first embodiment, the transmission side of the image data compression communication system YUV data is generated using a CCD or calculated by equations (1) above using RGB data. The resultant Y, U, and V data are supplied to the block encoder 12 in units of frames.

As in the first embodiment, the division unit 121 divides image data into blocks each having an arbitrary size of n×m pixels for each frame. As shown in FIG. 2, the division unit 121 of the third embodiment divides the image data into the blocks each having a size of 4×4 pixels, so that one frame of the original image is divided into 19,200 (=160×120) blocks.

Figure 11:
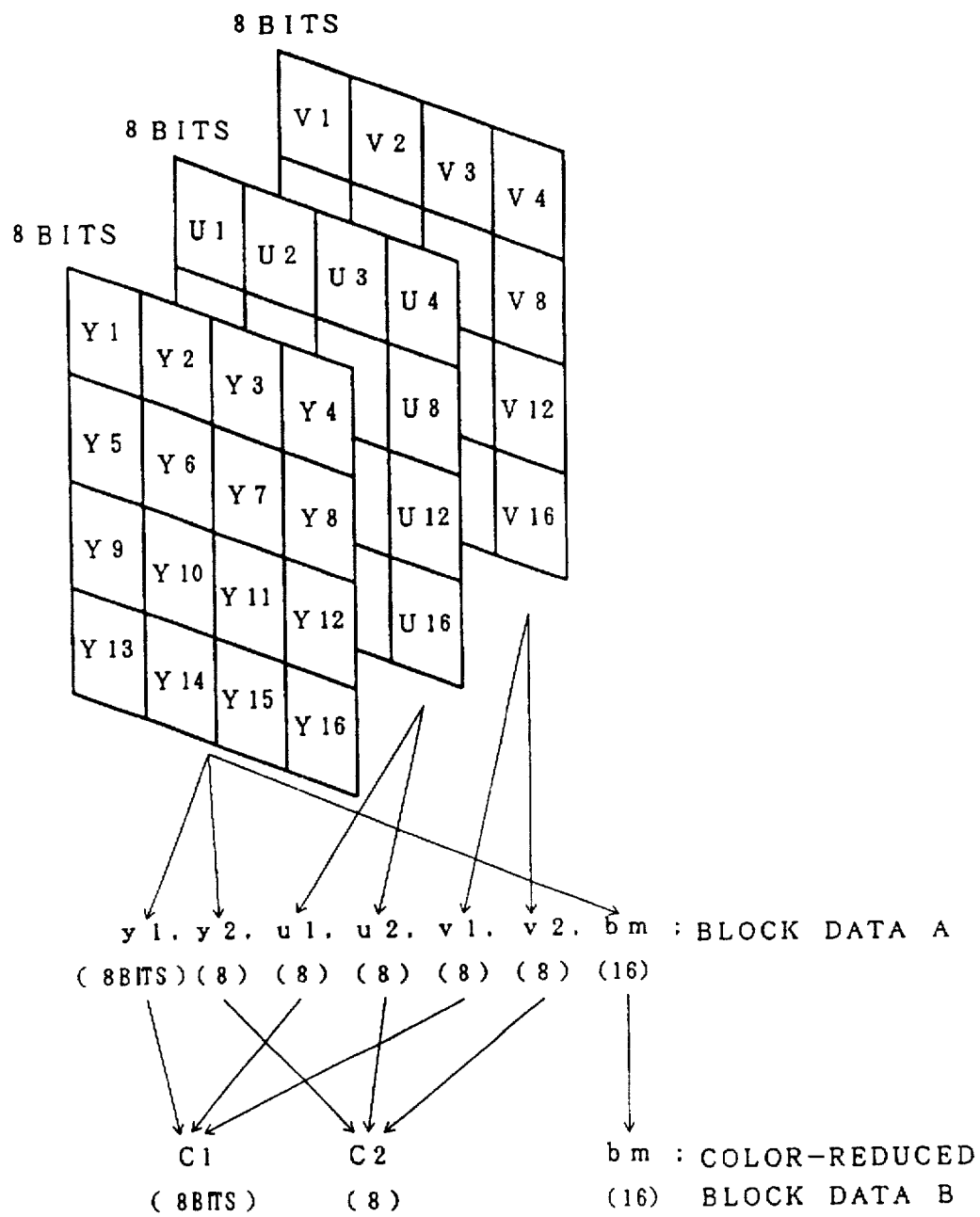
FIG. 11 is a view for explaining generation of block luminance components y1 and y2, block color difference components u1, u2, v1, and v2, and bm from the YUV data in an encoder of the third embodiment.

As shown in FIG. 11, the encoder 122 generates block data A constituted by block luminance components y1 and y2, block color difference components u1, u2, v1, and v2, and bm (bit map) in accordance with 16-pixel YUV data contained in each divided block. In this block data A, each of the components y1, y2, u1, u2, v1, and v2 is 8-bit data, and bm is 16-bit data.

In the division by the division unit 121, data of 384 (8 bits×3 components (Y, U and V)×16 pixels) bits per block is encoded and compressed into data of 64 bits, i.e., 8 bits×6 types (y1, y2, u1, u2, v1, and v2)+16 bits (bm). That is, the data is compressed into ⅙ (=64/384) data by the encoder 122.

The block components y, u, v, and bm are classified into the first color components constituted by y1, u2, and v1, second color components constituted by y2, u2, and v2, and bm. The first and second color components will be subjected to a color reduction process (to be described later).

The component bm is a map representing whether 16 pixels constituting each block represent the first or second color components. Each pixel corresponding to the first color components is represented by "1", while each pixel corresponding to the second color components is represented by "0".

The calculations of the respective block components will be described below.

First of all, the component bm for distinguishing the first color components from the second color components will be described below. The component bm is calculated by pixel luminance components Y1 to Y16 due to the nature that the human eye is sensitive to changes in luminance, but is not sensitive to changes in color, as described above.

That is, a threshold H is calculated from the pixel luminance components Y1 to Y16 within one block. The block luminance y1 and the block color difference components u1 and v1 of a pixel having a pixel luminance component Yh equal to or larger than the threshold H are defined as the first color components. On the other hand, the block luminance component y2 and the block color difference components u2 and v2 of a pixel having a luminance component Y1 smaller than the threshold H are defined as the second color components.

The threshold H can be determined in accordance with a variety of arbitrary methods. However, in the third embodiment, the threshold H is defined as an average value of 14 pixel luminance components Y excluding a maximum and minimum values Ymax and Ymin of the pixel luminance components Y.

The average pixel luminance value of all the pixels having the pixel luminance components Yh equal to or larger than the threshold H is defined as the block luminance component y1, while the average pixel luminance value of all the pixels having the pixel luminance components Y1 smaller than the threshold H is defined as the block luminance component y2.

The average values of all the pixel color difference components U(Yh) and V(Yh) of all the pixels serving as the first color components are defined as block color difference components u1 and v1. The average values of all the pixel color difference components U(Y1) and V(Y1) of all the pixels serving as the second color components are defined as block color difference components u2 and v2.

The threshold H, the first color components y1, u1, and v1, and the second color components y2, u2, and v2 are calculated by equations (4) below:

$$H=[(\Sigma Y)-Y_{max}-Y_{min}]/14$$

$$y1=(\Sigma Yh)/p$$

$$u1=(\Sigma U(Yh))/p$$

$$v1=(\Sigma V(Yh))/p$$

$$y2=(\Sigma Y\,l)/q$$

$$u2=(\Sigma U(Y\,l))/q$$

$$v2=(\Sigma V(Y\,l))/q \qquad (4)$$

where p is the number of components Yh, and q is the number of components Y 1 for p+q=16 (=n×m), U(Yh) and V(Yh) are the color difference values of the pixels whose luminance components take Yh (i.e. bm takes "1"), and U(Y l) and V(Y l) are the color difference values of the pixels whose luminance components take Y l (i.e., bm takes "0").

FIGS. 12A to 12D show the practical calculations of the threshold H, the block luminance components y1 and y2, and the block color difference components u1, u2, v1, and v2.

Assume that the pixel luminance components Y1 to Y16 in one block take values shown in FIG. 12A. The maximum value Ymax of the pixel luminance components is the value, "10", of the component Y9, and the minimum value Ymin of the pixel luminance components the value, "1", of the component Y16. The average value of the remaining luminance components except for the pixel luminance components Y9 and Y16 is calculated as 5.14 (=(83−10−1)/14). Therefore, the threshold H 5.14 is obtained.

Pixel components Yh having values equal to or larger than this threshold H are seven components, i.e., Y1, Y5, Y6, Y9, Y10, Y13, and Y14, as indicated by the hatched regions in FIG. 12B, and y1 is given as y1=77.1 in accordance with the average value of these components. Pixel components Y l having values smaller than this threshold H are nine components, i.e., Y2, Y3, Y4, Y7, Y8, Y11, Y12, Y15, and Y16, as indicated by the dotted regions, and y2 is given as y2=3.22 in accordance with the average value of these components.

As shown in FIG. 12C, the values of the seven components Yh are all defined as the block luminance components y1 and represented by codes "1", respectively. On the other hand, the values of the nine components Y l are all defined as the block luminance components y2 and represented by codes "0", respectively, thereby generating a binary bit map bm.

That is, bm=("1000011001100110") is obtained.

Similarly, the block color difference component u1 is calculated in accordance with the average value of the pixel color difference components U1, U5, U6, U9, U10, U13, and U14 of pixels whose pixel luminance components are components Yh, and the block color difference component v1 is calculated in accordance with the average value of the pixel color difference components V1, V5, V6, V9, V10, V13, and V14 of pixels whose pixel luminance components are components Yh. In addition, the block color difference component u2 is calculated in accordance with the average value of the pixel color difference components U2, U3, U4, U7, U8, U11, U12, U15, and U16 of pixels whose pixel luminance components are components Y 1 and the block color difference component v2 is calculated in accordance with the average value of the pixel color difference components V2, V3, V4, V7, V8, V11, V12, V15, and V16 of pixels whose pixel luminance components are components Y 1.

As shown in FIG. 12D, one block consisting of 16 pixels is represented by the first color given by the first color components y1, u1, and v1 represented by the hatched regions and the second color given by the second color components y2, u2, and v2 represented by the dotted regions.

The block encoder 12 supplies the block components consisting of the block color components y1, u1, v1, y2, u2, and v2 and the bit map component bm of each block which are generated by the encoder 122 to the color reduction unit 15.

The color reduction unit 15 stores all the supplied block components of one frame in a frame buffer (not shown) in the CLUT generator 151 to generate a CLUT. More specifically, the CLUT generator 151 determines, e.g., 256-color color reduction data y, u, and v properly representing the feature of an image from all the color components yx, uy, and vz, i.e., 38,400 (=(160×120 blocks)×2 colors) combinations stored in the frame buffer. The color reduction data y, u, and v which properly represent the feature of an image are determined using the median cut method proposed by Heckbert, the New York Institute of Technology, or the population equalize method proposed by Tozawa, Nihon IBM.

Figures 13A, 13B:
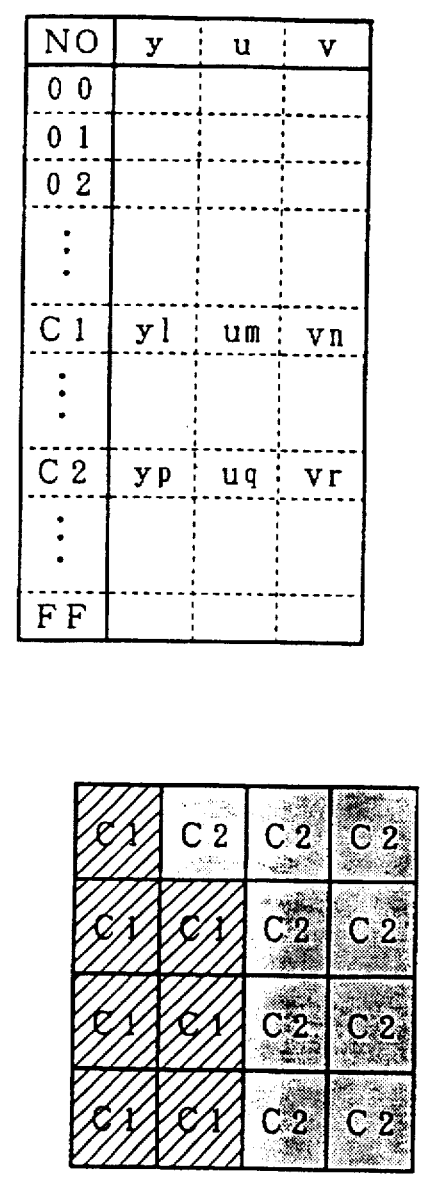

As shown in FIG. 13A, indices from "00" to "FF" are assigned corresponding to the color reduction data y, u, and v to generate a CLUT. This CLUT is stored in a predetermined storage area. The generated CLUT is also supplied to the transmitter 14 and transmitted to the receiver 24 on the reception side.

In the CLUT generation process, the CLUT generator 151 extracts color reduction block components Cx, Cy, and bm having the highest frequency of occurrence and supplies the extracted components to the reference block buffer 132 in the compressor 13.

Subsequently, the color reduction processing unit 152 performs color reduction for the first color components y1, u1, and v1 and the second color components y2, u2, and v2 of each block, which components are stored in the frame buffer. That is, a color most similar to each component is selected from the CLUT and is converted into corresponding indices C1 and C2.

For example, assume that the color components which coincide with or are most similar to the block luminance component y and the block color difference components u and v of the first color components y1, u1, and v1 are y1 um, and vn. In this case, the corresponding index, i.e., C1 is selected. Similarly, when the components which coincide with or are most similar to the second color components y2, u2, and v2 are yp, uq, and vr, the corresponding index, i.e., C2 is selected. As a result, the block data (FIG. 12D) generated by the encoder 122 is as shown in FIG. 13B. In this stage, the format of the color-reduced block data B is as shown in FIG. 11. That is, the indices C1 and C2 are 8-bit data, respectively, and the bit map bm is 16-bit data.

The data C1, C2, and bm are supplied to the line buffer 131 in the compressor 13 as the components of the color-reduced block data B for each block.

The compressor 13 sequentially stores the color-reduced block data B from the block encoder 12 into the line buffer 131. The encoder 133 encodes the color-reduced block data (C1, C2, and bm) of a process block Cb (latest block) as an encoding target in accordance with the block component coincidence conditions with the reference block (Rb) and the blocks around the process block Cb.

Figure 14:
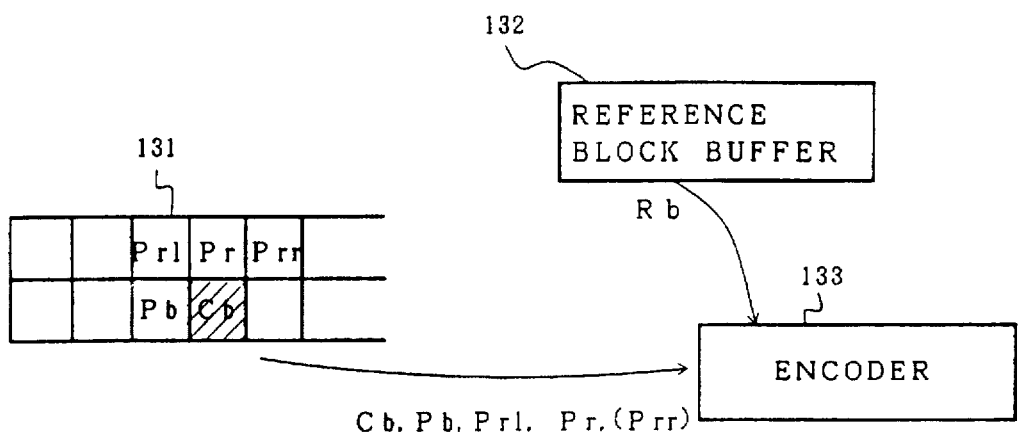
FIG. 14 is a view for explaining the concept of data encoding under block component coincidence conditions in an encoder of the third embodiment.

FIG. 14 is a view for explaining the concept of data encoding in accordance with the block component coincidence conditions.

Referring to FIG. 14, an operation for encoding a hatched block as a process block Cb of a frame divided into blocks each having a size of 4×4 pixels will be described below. It is assumed that the immediately preceding encoded block of the process block Cb is defined as Pb. Also assume that the upper left block (row #2 and column #2), the immediately above block (row #2 and column #3), and the upper right block (row #2 and column #4), all of which are processed one row ahead with respect to the process block Cb are defined as Pr 1 Pr, and Prr, respectively.

The color-reduced block components of the process block Cb are compared with the block components of the comparison blocks Rb, Pb, Pr 1, Pr, and Prr to find coincident blocks, thereby encoding the process block in accordance with encoding rules (FIG. 15A) using the coincident block.

For example, when the process block Cb coincides with the reference block Rb, the block components C1, C2, and bm (a total of 32 bits) of the process block Cb is compressed into 2-bit data ("00").

In this case, the components C1 and C2 of the color-reduced block data B are subjected to reversible compression when they perfectly coincide with the components of a coincident block, but the component bm is determined to coincide with that of the coincident block if the component bm is similar to that of the coincident block within a predetermined range.

If no coincident block exists in the comparison blocks, the encoder 133 determines the block components of one of the reference block Rb, the immediately above block Pr, and the immediately preceding block Pb to which the block components of the reference block Cb are most similar. The encoder 13 performs encoding using a similar block in accordance with rules in FIG. 15.

More specifically, each code is represented by a 2- or 3-bit header representing the most similar block, a 3-bit map ("●●●") representing the coincidence or noncoincidences of the corresponding block components C1, C2 or bm, and noncoincident Cb components (★★ ...). "●●●" is a bit string of "0"s for a coincidence or "1"s for a noncoincidence. ★ represents a numeric value as the actual component value of the process block Cb. The components C1 and C2 are 8-bit data, respectively, and the component bm is 16-bit data.

It is assumed that the components of the process block Cb and the immediately preceding block Pb similar to the process block Cb have the following values:
Cb; C1=0b, C2=11, bm=x
Pb; Cx=0b, Cy=12, bm=x In this case, the code of the process block Cb is represented as follows. The header is represented by a bit string "111" representing the immediately preceding block as a similar block. The coincidence/noncoincidence bit map is represented by a bit string "010" because the components C1 and bm coincide with the components Cx and bm, but the component C2 does not coincide with the component Cy. The noncoincidence component value of the component C2 is represented by C2=11 of the process block Cb.

The code of the process block Cb becomes 3-bit header ("111")+3-bit coincidence/noncoincidence bit map ("010") +8-bit noncoincidence component value (11).

The encoded data of the color-reduced block components of the process block Cb encoded by the compressor 13 has a minimum data volume when it coincides with the reference block Rb. In this case, when the data is divided by the division unit 121, the data volume is 383 (8×3×16) bits, so that the data is compressed into 1/192 data.

The data encoded by the compressor 13 has a maximum volume when no inter-frame coincidence is present and none of the components of the process block Cb coincides with any components of the blocks Rb, Pr, and Pb. In this case, when the process block is encoded on the basis of the reference block Rb, the data encoded by the compressor 13 is 37 (=2+3+32) bits. The compression ratio is 1/10.38 (=37/384).

The encoded data of the color-reduced block data B encoded by the encoder 133 is supplied from the compressor 13 to the transmitter 14 in units of blocks. In the transmitter 14, following the CLUT and the reference block Rb, the encoded data of the color-reduced components B is transmitted to the reception side in FIG. 10B through a variety of communication means such as a telephone network, a leased network, radio communication, ISDN (Integrated Services Digital Network), and computer communication.

When the receiver 24 on the reception side receives data transmitted from the transmission side, the receiver 24 supplies the received data to the separator 234 in the decompressor 23. The separator 234 separates the input data into the CLUT, the reference block Rb, and the subsequently received encoded data. The separator 234 supplies the CLUT to the output unit 21, stores the reference block Rb in the reference block buffer 233, and supplies the encoded data to the decoder 231.

The decoder 231 selects a comparison block from the reference block Rb, the immediately preceding block Pb, the upper left block Pr 1 and the immediately above block Pr for the encoded data in accordance with the encoding code assignment rules in FIGS. 15A and 15B.

If the encoded data is a code representing an inter-block coincidence, the block components C1, C2, and bm stored (already decoded) at the corresponding positions are determined as the block components of a process block Db as a target block and stored in the line buffer 232.

If the encoded data is a code representing an inter-block noncoincidence, the block components of the process block Db are generated in accordance with the encoding rules (FIG. 15B) using the encoded data and the block components of a similar block designated by the header of the encoded data.

The generated block components are stored in the line buffer 232.

The non-encoded block components C1, C2, and bm of the process block Db are generated by the decoder 231 to be supplied to the block decoder 22.

The block decoder 22 generates data of 4×4 pixels (pixel value for an index color display) from the block components C1, C2, and bm. That is, if the component bm of the color-reduced components is a bit map shown in FIG. 16A, a pixel corresponding to bit map data of "0" becomes C1, and a pixel corresponding to bit map data of "1" becomes C2, as shown in FIG. 16B. In this manner, the decoded block data of 16 (4×4) pixels serve as data representing two types (C1 and C2) of index colors.

The index values of the components C1 and C2 representing the index colors are supplied to the output unit 21 in units of pixels.

The output unit 21 converts the CLUT separated by and supplied from the separator 234 into a corresponding luminance signal y and corresponding color difference signals u and v. These converted signals are then D/A-converted and displayed on a variety of display devices such as a CRT, a plasma display, and a liquid crystal display device used in a video phone, a video conference, and a communication karaoke (none are shown).

When a display device connected to the apparatus does not require y, u, and v data but R, G, and B data, the output unit 21 calculates and outputs the R, G, and B data from the y, u, and v data in accordance with equations (5):

$$B=1.773u+y$$

$$R=1.403v+y$$

$$G=y-(0.564/0.587)u+(0.713/0.587)v$$

As described above, according to the third embodiment, since the data is compressed into ⅙ data in units of blocks by the block encoder 12 prior to encoding in the compressor 13, the size of the line buffer 131 can be reduced.

The encoding process for the block components by the encoder 133 and the decoding process for the encoded data by the decoder 231 are only detection of the inter-frame coincidence and conversion using the encoding rules in FIGS. 15A and 15B. Software can sufficiently cope with data encoding and decoding without using high-speed encoding and decoding hardware arrangements.

In an image data compression communication system wherein still and moving images are transmitted from one location such as a central station in a given building and received by a plurality of locations, software using small-capacity buffers enables image processes on both the apparatuses on the transmission and reception sides.

According to the third embodiment, an image data compression communication system can be made simple.

According to the third embodiment, since a CLUT is generated on the transmission side, a color reduction process need not be performed in the apparatus on the reception side, thereby allowing high-speed processing.

In addition, since block data is subjected to a color reduction process, the color reduction process in the compression apparatus can be performed at high speed.

According to the third embodiment, as described above, the block component bm is determined to be coincident with a comparison block if the block component bm is similar to that of the comparison block within a predetermined range. The present invention is not limited to this. A condition for determining a perfect coincidence between the block component of the process block and that of the comparison block may be employed. In addition, the condition need not be limited to the perfect coincidence. Sixty-four typical bit maps such as all "1"s, all "0"s, "1"s in the upper half of a bit map, "1"s in the right half of a bit map, "1"s in every other columns, ... may be prepared, and each table may be designated by a 6-bit code. In this manner, since the block components bm are compared using each of the 64 tables each represented by 6 bits, the degree of inter-block coincidences increases to further compress the data. Even if a noncoincidence is determined, data compression by 10 bits is attained because a 16-bit bit map is expressed in a 6-bit code string.

In the third embodiment, the bit map bm is expressed in 16 bits. However, the bit map may be divided into upper eight bits and lower eight bits. That is, the components of the color-reduced block data B may be represented by C1 (8 bits), C2 (8 bits), bmh (8 bits), and bml (8 bits), and data encoding may be performed in accordance with the block component coincidence conditions with the reference block Rb and the blocks around the process block Cb.

In this case, an inter-block coincidence code is identical to that shown in FIG. 15A. An inter-block component coincidence code is "10+●●●●+★ ... " for Rb, "110+●●●●+★ ... " for Pr, or "111+●●●●+★ ... " for Pb.

In the third embodiment, each of the block components y1, u1, v1, y2, u2, and v2 is expressed in eight bits. However, the present invention is not limited to this. For example, each block component may be expressed in 6 bits or other numbers of bits such as 5 or 4 bits. Alternatively, the luminance and color difference signals may be expressed as data having different numbers of bits such that each of ya and yb is expressed as 8- or 6-bit data and each of u and v is expressed as 6- or 5-bit data.

In calculations of the block color difference components u and v from the pixel color difference components U and V, the average values of the components U and V are used in the above embodiment. However, the values of pixel color difference components U and V each having the highest frequency of occurrence (maximum population) in the process block may be defined as the block color difference components u and v.

The average value of the pixel luminance components excluding the maximum and minimum pixel luminance components Ymax and Ymin is used as the threshold H for distinguishing the block luminance components y1 and y2 from each other. However, a simple average value of all the pixel luminance components Y may be defined as the threshold H, or an arbitrary value may be set as the threshold H in accordance with the types of image data to be compressed.

In the third embodiment, when none of the block components of the process block Cb coincides with those of any of the blocks Rb, Pb, Pr l,Pr, and Prr, Pb, Pf, and Pb are used as the selection block candidates for similar blocks, as shown in FIG. 15B. However, the present invention is not limited to this. An arbitrary block may be selected in advance, and a similar block may be selected with reference to the arbitrary block. For example, two blocks, Rb and Pr, or three blocks Rb, Pr, and Pb may be used as selection candidates.

In this embodiment, the blocks Rb, Pb, Pr l,Pr, and Prr are used as comparison targets for determining whether their block components coincide with all the block components of the process block Cb. However, the blocks Rb, Pb, and Pr having higher probabilities of coincidences may be used as targets. In this manner, when the number of comparison targets is reduced, the software process can be further facilitated.

According to the third embodiment, 256 colors having high frequencies of occurrence are selected from all the colors to generate a CLUT. However, the present invention is not limited to this. The colors may be reduced to an arbitrary number of colors such as 128, 64, 512, or 1024.

In the third embodiment, each of the block components y, u, and v is 8-bit data, but may be 6- or 5-bit data.

In the third embodiment, equations (1) to (5) are used as the conversion formulas between RGB data and YUV data. However, other equations (6) and (7) may be used in the present invention:

$$Y = 0.299R + 0.587G + 0.114B$$

$$U = B - Y$$

$$V = R - Y \qquad (6)$$

$$G = Y - (0.299/0.587)V - (0.114/0.587)U$$

$$B = Y = U$$

$$R = Y + V \qquad (7)$$

In the third embodiment, in determining the reference block Rb, color reduction block data having the highest frequency of occurrence is detected in generation of a CLUT and defined as the reference block Rb. The present invention is not limited to this. A reference block may be determined in consideration of the compression ratio in the compressor 13.

For example, the data of a reference block are not extracted as the color reduction block data having the highest frequency of occurrence, but a plurality of color reduction block data Rb1, Rb2, Rb3, . . . of the upper level are extracted as the reference block. The compressor 13 encodes each reference block. A color reduction block data having a minimum data volume upon encoding is determined as a reference block. In this case, the encoder 133 encodes the reference blocks Rb1, Rb2, . . . , and counts the data volumes, thereby determining a reference block having the minimum data volume.

A frame buffer is located between the color reduction unit 15 and the compressor 13 to store the color-reduced block data B of one frame.

The compressor 13 may perform one-frame encoding without the reference block Rb. A block used as one having the highest degree of inter-block coincidence may be employed as the reference block Rb.

Color-reduced block data having the highest frequency of occurrence may be defined as a virtual reference block Rb', and one-frame encoding may be performed. In this case, a block having the highest degree of inter-block coincidence may be used as the reference block Rb. If the virtual reference block Rb' is used as a block having the highest degree of inter-block coincidence, this block may be directly used as the reference block.

The line buffer 131 may be used as a frame buffer in place of an arrangement in which the frame buffer is arranged between the color reduction unit 15 and the compressor 13.

The preferred embodiment described above are merely illustrative examples, but do not limit the scope of the present invention. Various changes and modifications may be made without departing from the spirit and scope of the appended claims. That is, the scope of the present invention is defined in the appended claims, and all modifications incorporated in the scope of the appended claims are also incorporated in the present invention.

What is claimed is:

1. An image data compression apparatus comprising:

image data generating means for generating image data of pixels, each of said data of pixels constituted by a luminance signal and color difference signals;

a block generator for generating data of blocks from the image data generated by said image data generating means, each of said blocks consisting of n×m pixels;

block luminance generating means for generating two luminance signals ya and yb representing each of said blocks;

block color difference generating means for generating one pair of color difference signals u and v from said data of each of said blocks generated by said block generator, said color difference signals u and v representing said blocks;

bitmap generating means for generating n×m bitmap bm for each of said blocks wherein the n×m bitmap represents the distribution of the two luminance signals generated by said block luminance generating means; and encoding means for generating block components from said to luminance signals ya and yb generated by said block luminance generating means, said one pair of color difference signals u and v generated by said block color difference generating means, and said n×m bit map bm generated by said block generator.

2. An image data compression apparatus according to claim 1, further comprising:

similar block selecting means for selecting a similar block coincident with or similar to a block being encoded in regard to the block components generated by said encoding means; and compressing means for encoding said block components of the block being encoded with code data and difference data, said code data representing the relative position of said similar block selected by said similar block selecting means in regard to said block being encoded, and said difference data representing differences between the block components of said similar block and the block components of said block being encoded by said encoding means.

3. An image communication system comprising:

said image data compression apparat image claim 1; and an image elongation apparatus having receiving means for receiving a signal transmitted from said image data compression apparatus, and decoding means for generating a luminance signal and color difference signals of each pixel constituting an n×m block in accordance with block components received by said receiving means.

4. An image communication system comprising:

said image data compression apparatus of claim 2; and an image elongation apparatus having receiving means for receiving a signal transmitted from said image data compression apparatus, and decoding means for generating a luminance signal and color difference signals of each pixel constituting an n×m block in accordance with block components received by said receiving means.

5. An image data compression apparatus comprising:

image data generating means for generating one-frame image data for a still image, each data constituted by a luminance signal and color difference signals;

a block generator for generating block data representing blocks each consisting of n×m pixels from the image data generated by said image data generating means;

a most frequent block detector for detecting a most frequent block component from all block components generated by said block generator;

encoding means for generating block components constituted by a plurality of luminance and color difference signals representing a block, and an n×m bit map representing a luminance signal component distribution from the block data generated by said block generator;

said encoding means selecting a coincident or most similar block on the basis of block components including the block components of the most frequent block detected by said most frequent block detector; and compressing means for encoding the block components generated by said encoding means in accordance with the block components, or in accordance with code data representing the selected coincident or most similar block from said encoding means and difference data between the block components of the selected block and the present block components generated by said encoding means.

6. An image data compression apparatus comprising:

image data generating means for generating image data having pixel data each constituted by a luminance signal and color difference signals;

block generating means for generating block data representing blocks each consisting of n×m pixels from the image data generated by said image data generating means;

encoding means for generating block components constituted by first and second color components each representing a block and constituted by a luminance signal and color difference signals, and an n×m bit map representing a distribution of the first and second color components in accordance with the block data generated by said block generating means;

CLUT generating means for generating a CLUT for performing a color reduction process for the first and second color components generated by said encoding means so as to obtain an arbitrary number of colors; and transmitting means for transmitting the CLUT generated by said CLUT generating means and the block components generated by said encoding means.

7. An apparatus according to claim 4, wherein said apparatus further comprises color reduction means for performing the color reduction process for the first and second color components of the block components generated by said encoding means in accordance with the CLUT generated by said CLUT generating means, thereby generating block components constituted by color-reduced first and second color components and an n×m bit map, and said transmitting means transmits the CLUT generated by said CLUT generating means and the color-reduced block components generated by said color reduction means.

8. An apparatus according to claim 6, wherein said apparatus further comprises compressing means for selecting a similar block whose block components coincide with or are most similar to the block components generated by said encoding means or the color-reduced block components generated by said color reduction means, and encoding the block components generated by said encoding means or color reduction means in accordance with code data representing the similar block and difference data between the block components of the similar block and the block components generated by said encoding means or said color reduction means, and said transmitting means transmits the CLUT generated by said CLUT generating means and the data encoded by said compressing means.

9. An image data compression apparatus according to claim 6, wherein said apparatus further comprises most frequent block detecting means for detecting a block having most frequent color-reduced block components upon the color reduction process using the GLUT generated by said GLUT generating means, said image data generating means generates one-frame image data for a still image, said encoding means selects a coincident or most similar block on the basis of block components including the block components of the most frequent block detected by said most frequent block detecting means, and said transmitting means further transmits the block components of the most frequent block detected by said most frequent block detecting means.

10. An apparatus according to claim 7, wherein said apparatus further comprises compressing means for selecting a similar block whose block components coincide with or are most similar to the block components generated by said encoding means or the color-reduced block components generated by said color reduction means, and encoding the block components generated by said encoding means or color reduction means in accordance with code data representing the similar block and difference data between the block components of the similar block and the block components generated by said encoding means or said color reduction means, and said transmitting means transmits the CLUT generated by said CLUT generating means and the data encoded by said compressing means.

11. An image data compression apparatus according to claim 7, wherein said apparatus further comprises most frequent block detecting means for detecting a block having most frequent color-reduced block components upon the color reduction process using the CLUT generated by said CLUT generating means, said image data generating means generates one-frame image data for a still image, said encoding means selects a coincident or most similar block on the basis of block components including the block components of the most frequent block detected by said most frequent block detecting means, and said transmitting means further transmits the block components of the most frequent block detected by said most frequent block detecting means.

12. An image data compression apparatus according to claim 8, wherein said apparatus further comprises most frequent block detecting means for detecting a block having most frequent color-reduced block components upon the color reduction process using the CLUT generated by said CLUT generating means, said image data generating means generates one-frame image data for a still image, said encoding means selects a coincident or most similar block on the basis of block components including the block components of the most frequent block detected by said most frequent block detecting means, and said transmitting means further transmits the block components of the most frequent block detected by said most frequent block detecting means.

* * * * *

UNITED STATES PATENT AND TRADEMARK OFFICE
CERTIFICATE OF CORRECTION

PATENT NO. : 5,787,192
DATED : July 28, 1998
INVENTOR(S) : TAKAICHI et al

It is certified that error appears in the above-indentified patent and that said Letters Patent is hereby corrected as shown below:

Col. 7, line 17, after "components" insert --of--.

Col. 19, line 20, "B=Y=U" should read --B=Y+U--.

Col. 20, line 43, "apparat image" should read --apparatus of--.

Col. 22, line 8, "GLUT" should read --CLUT--; and
      line 9, "GLUT" should read --CLUT--.

Signed and Sealed this

Twenty-ninth Day of June, 1999

Attest:

Q. TODD DICKINSON

*Attesting Officer*     Acting Commissioner of Patents and Trademarks